United States Patent [19]

Hirano

[11] Patent Number: 4,588,140
[45] Date of Patent: May 13, 1986

[54] REVERSE PREVENTION DEVICE FOR FISHING REEL

[75] Inventor: Kazuo Hirano, Tokyo, Japan

[73] Assignee: Daiwa Seiko, Inc., Higashikurume, Japan

[21] Appl. No.: 773,525

[22] Filed: Sep. 6, 1985

Related U.S. Application Data

[63] Continuation of Ser. No. 513,414, Jul. 14, 1983, abandoned, which is a continuation-in-part of Ser. No. 313,193, Oct. 20, 1981, abandoned.

[30] Foreign Application Priority Data

Nov. 14, 1980 [JP] Japan .............................. 55-162929

[51] Int. Cl.$^4$ .............................................. A01K 89/01
[52] U.S. Cl. .................................. 242/84.2 R; 74/576; 188/82.4
[58] Field of Search ...................... 242/84.1 R, 84.2 R, 242/84.21 R, 84.5 A, 84.51 A; 74/576; 188/82.3, 82.34, 82.4

[56] References Cited

U.S. PATENT DOCUMENTS

| 210,251 | 11/1878 | Crosclaude | 74/576 |
| 2,863,617 | 12/1958 | Chapin et al. | 242/84.5 A |
| 3,160,028 | 12/1964 | Frame | 74/576 |
| 3,225,874 | 12/1965 | Woolley | 74/576 |
| 4,087,058 | 5/1978 | Yamasaki et al. | 242/84.51 A |
| 4,163,528 | 8/1979 | Egasaki et al. | 242/84.21 R |
| 4,288,046 | 9/1981 | Morimoto et al. | 242/84.21 R |

FOREIGN PATENT DOCUMENTS

| 1164184 | 2/1964 | Fed. Rep. of Germany | 74/576 |
| 38378 | 10/1906 | Switzerland | 74/576 |

Primary Examiner—Billy S. Taylor
Attorney, Agent, or Firm—Browdy and Neimark

[57] ABSTRACT

A device for preventing reversing of a fishing spinning reel of the type having a rotor for retaining a fishing line and fixed to a rotary shaft sleeve adapted to rotate in accordance with the rotation of a handle shaft, so that the fishing line is wound up around a spool by the rotation of the handle shaft. The device includes a reverse preventing ratchet pawl for engagement with the ratchet wheel and pivotally secured to a wall of the reel housing, and a resilient member fixed to the pawl and having a unitary resilient tab formed at a portion thereof near the shaft portion of the pawl. The resilient tab engages the teeth of the ratchet wheel, and causes the pawl to be switched between an operative position and an inoperative position when cam means, carried by the reel housing, is in an operative position.

16 Claims, 6 Drawing Figures

REVERSE PREVENTION DEVICE FOR FISHING REEL

RELATED APPLICATIONS

This application is a continuation of application Ser. No. 513,414, filed July 14, 1983, now abandoned, which was a continuation-in-part of application Ser. No. 313,193, filed Oct. 20, 1981, now abandoned.

BACKGROUND OF THE INVENTION

The present invention relates to an improvement in a reverse prevention device for fishing reels. A so-called silent stopper has been known as a device for preventing reversing of a fishing reel during winding up of the fishing line. An example of the silent stopper has, as shown in Japanese Utility Model Publication No. 8715/1977, a reverse prevention pawl having a spring adapted to clamp a reverse prevention ratchet wheel. Another example, shown in Japanese Utility Model Publication No. 33018/1977, has a coiled spring wound round the shaft of a reverse prevention ratchet wheel and engaging a reverse prevention pawl. Thus, in the conventional devices, the prevention of reversing of the reel has been attained by making use of the frictional force on the reverse prevention ratchet wheel.

These conventional devices relying upon the frictional force have the following disadvantages. Since the reverse prevention pawl tends to engage the teeth of the reverse prevention ratchet wheel irrespective of the position of the teeth during reversing of the reel, the pawl does not engage the teeth immediately unless the reverse prevention pawl takes a position facing one of the teeth of the ratchet wheel. In the conventional devices, the instantaneous and safe engagement of the reverse prevention pawl with the teeth of the ratchet often fails, and serious wear is caused on both of the reverse prevention pawl and ratchet wheel. In addition, smooth rotation of the reverse prevention ratchet wheel often fails due to a large resistance against rotation. These problems are serious particularly in the reel designed and constructed for high-speed rotation.

Moreover, although the prior art includes ratchet wheel and pawl constructions, generally, which facilitate smooth noiseless engagement of the pawl with the ratchet wheel, they cannot achieve a mode of operation in which reverse rotation of the ratchet is prevented. For example U.S. Pat. No. 210,251 to Grosclaude is representative of the prior art and discloses a ratchet wheel "a" and a pawl "b" including a spring "d" positioned between the pawl and the ratchet wheel. The spring rests on the teeth of the ratchet wheel to keep the pawl raised and out of contact with the teeth while the wheel rotates in one direction. When the wheel rotates in the opposite direction, the free end of the spring abuts against the tooth located in front of it and forces the pawl to pivot into positive engagement with the teeth of the ratchet wheel.

Unlike the prior art pawl and ratchet devices as represented by the Grosclaude patent, the present invention provides for a construction having two modes of operation in which a pawl assumes on the one hand, an operative position, and on the other hand an inoperative position. In the operative position, the pawl is pivoted into or out of blocking engagement with the teeth of a rotatable ratchet wheel. In the inoperative position, pivoting of the pawl is prevented entirely.

The structure of the prior art, and in particular that of the Grosclaude patent, does not perform the function of the present invention, described in greater detail hereinbelow. Even if it were possible for the pawl "b" of Grosclaude to be set in an inoperative position, the tip of the spring "d" would be stretched in the reverse direction as it engaged the ratchet "a", and would undergo deformation and break when the ratchet rotated in reverse. Hence in Grosclaude, the ratchet "a" cannot be rotated smoothly and continuously in both directions, as it can be with the construction of the present invention. Thus, the present invention represents a tremendous advancement over the prior art.

SUMMARY OF THE INVENTION

According to one aspect of the invention, there is provided a reel reverse prevention device of the so-called silent stopper type, wherein the reverse prevention pawl is instantaneously and safely brought in engagement with a tooth of the reverse prevention ratchet wheel to stop the reversing of a rotor without delay and to avoid any wear of the reverse prevention pawl and the teeth of the reverse prevention ratchet wheel.

According to another aspect of the invention, there is provided a spinning reel reverse prevention device in which fishing line can be wound up easily and smoothly because no substantial friction is applied to the shaft of the reverse prevention ratchet wheel in contrast to the conventional devices.

According to still another aspect of the invention, there is provided a reel reverse prevention device in which the wear takes place only in a resilient tab of a resilient member which can be detached and attached easily for easy replacement.

BRIEF DESCRIPTION OF THE DRAWINGS

These and other advantages and features of the invention will become clear from the following description of the preferred embodiments, when considered in conjunction with the drawings, in which.

DESCRIPTION OF THE PREFERRED EMBODIMENTS

Figure 1:
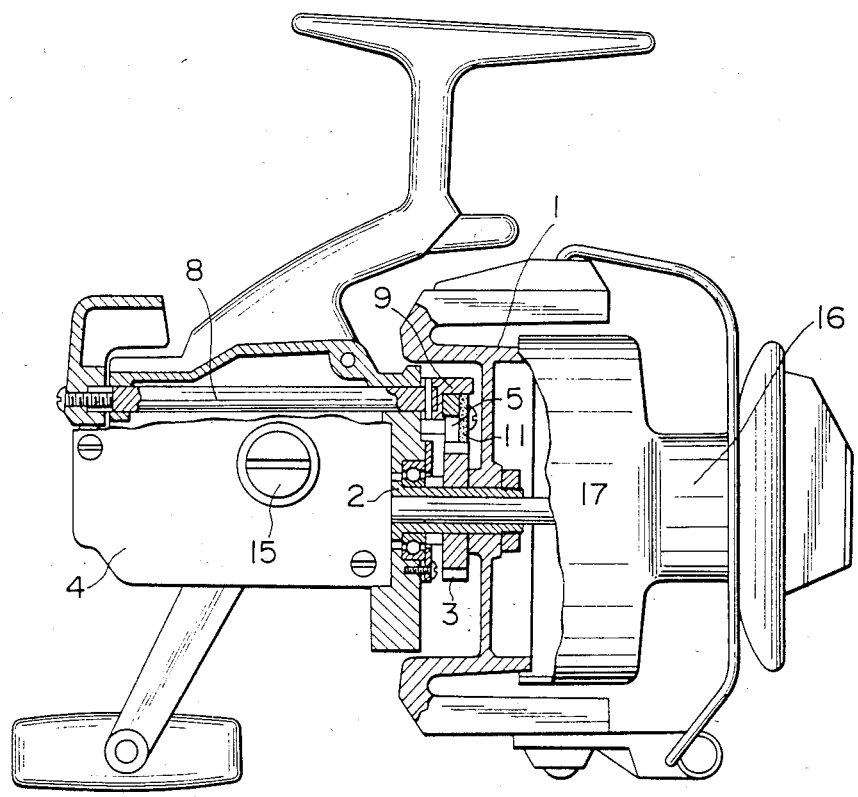
FIG. 1 is a sectional front elevational view of a part of a reel reverse prevention device of an embodiment of the invention in which a reverse prevention ratchet wheel is fixed to a rotary shaft sleeve of a rotor.

Referring first to FIGS. 1 thru 5 showing a first embodiment, a reverse prevention ratchet wheel 3 is fixed to a rotary shaft sleeve 2 integral with a rotor 1 for retaining and winding a fishing line in the spinning reel. A reverse prevention pawl 5 is rockably secured by means of a shaft 6 to the front end surface of a reel housing 4 in such a manner as to be able to engage the teeth of the reverse prevention ratchet wheel 3. An actuating piece 7 formed integrally with the other end of the reverse prevention pawl 5 is adapted to engage a cam 9 on one end of an operation lever 8 carried by the housing 4, thereby to station the reverse prevention pawl 5 at the operative position and inoperative position.

A resilient member 11 having a resilient tab 10 formed near the journal portion thereof is fixed to one side surface of the reverse prevention pawl 5. The resilient tab 10 is adapted to continuously engage the teeth of the reverse prevention ratchet wheel 3. The resilient member 11 as a whole is preferably made of synthetic rubber or a flexible synthetic resin resistant to oil. Examples of these substances include elastomers, such as polyurethane, or plastomers, such as polypropylene.

The operation lever 8 is adapted to be held either at an operative position or an inoperative position, by the action of a dead point spring 12. The reel housing 4 is provided with stoppers 13,14 for limiting the movements of the reverse prevention pawl 5 and the operation lever 8. A handle shaft 15 is operatively connected to the rotary shaft sleeve 2 through a gear train as is well known. A spool shaft 17 operatively connected to the handle shaft 15 and adapted to cause a reciprocating movement of a spool 16 is inserted to the rotary shaft sleeve 2. The resilient member 10 is prevented from rotating by a pin 18 formed on the reverse prevention pawl 5 to project from the latter.

Figure 2:
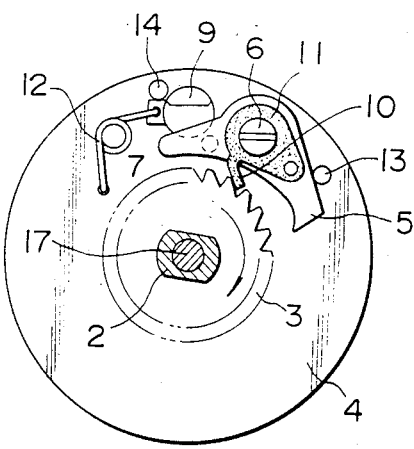
FIG. 2 is a side elevational view of the rotary shaft sleeve showing forward rotation, when the reverse prevention pawl of FIG. 1 is in the operative position.
Figure 3:
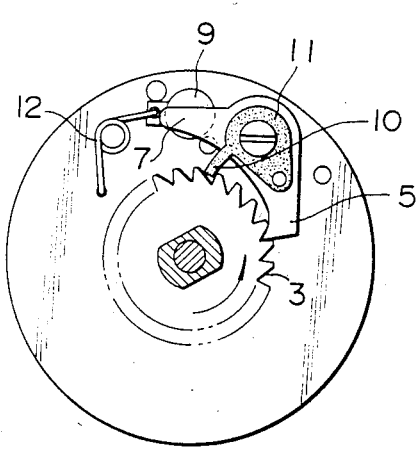
FIG. 3 is a side elevational view of the rotary shaft sleeve showing backward rotation, when the reverse prevention pawl of FIG. 1 is in the operative position.

Therefore, as the rotary shaft sleeve 2 is forwardly rotated in the direction indicated by the arrow in FIG. 2 for winding up the fishing line while holding the cam 9 in the operative position shown in FIGS. 2 and 3 by means of the operation lever 8, the resilient tab 10 of the resilient member 11 acts to rotate the reverse prevention pawl 5 counter-clockwise by means of egagement with the ratchet wheel 3 away from the latter thereby to permit the rotor 1 to wind up the fishing line on the spool 16. On the other hand, as the rotary shaft sleeve 2 tends to rotate backwardly in the direction indicated by an arrow in FIG. 3, the resilient tab 10 acts to rotate the reverse prevention pawl 5 clockwise by means of the reverse prevention ratchet wheel 3 to bring the pawl into engagement with the teeth of the ratchet wheel 3 thereby to prevent the reversing of the rotary shaft sleeve 2.

When the reverse prevention pawl 5 takes the operative position as stated, the reverse prevention pawl 5 is brought into engagement with the teeth of the ratchet wheel 3 without delay and safely, thereby to stop the reversing of the rotor 1 immediately.

Figure 4:
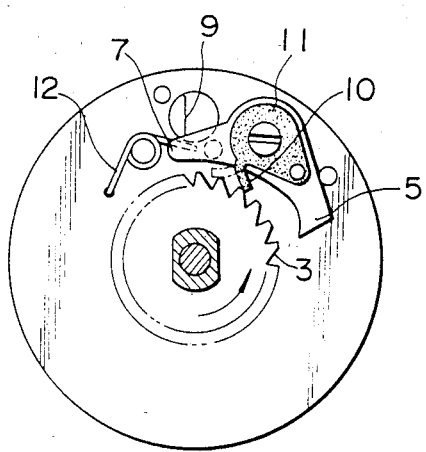
FIG. 4 is a side elevational view of the rotary shaft sleeve showing forward rotation, when the reverse prevention pawl of FIG. 1 is in the inoperative position.
Figure 5:
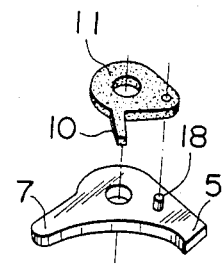
FIG. 5 is an exploded perspective view of the reverse prevention ratchet wheel.

Alternatively, when the cam 9 is held in the operative position as shown in FIG. 4 by the action of the operation lever 8, the actuating piece 7 acts to hold the reverse prevention pawl 5 at a position away from the reverse prevention ratchet wheel 3 by the action of the cam 9, thereby to permit the rotary shaft sleeve 2 to freely rotate in the forward and backward directions.

Figure 6:
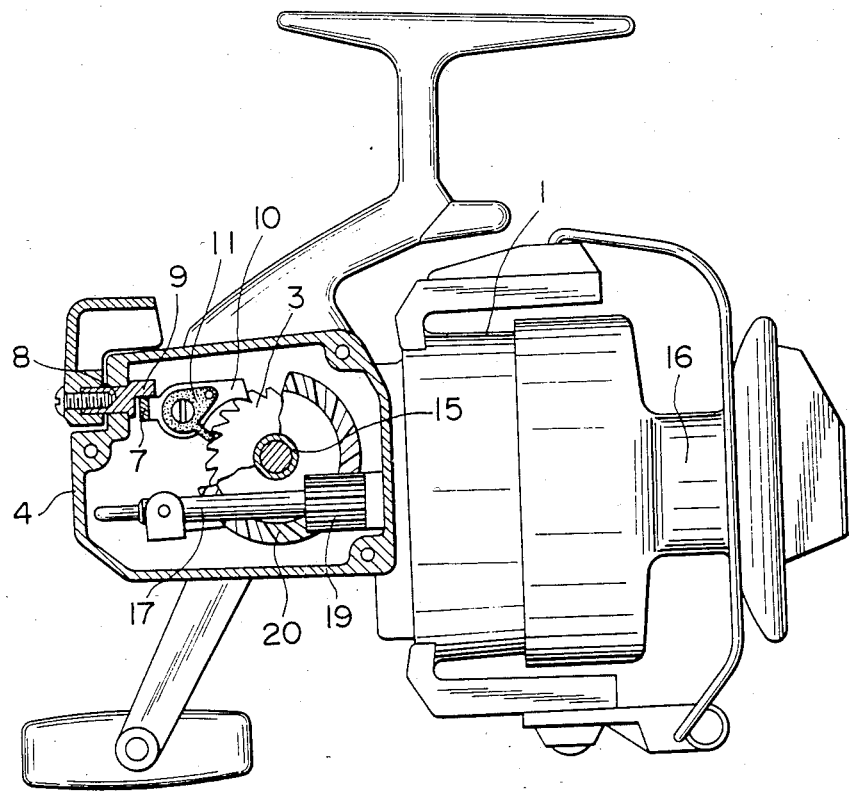
FIG. 6 is a partly sectional front elevational view of a reel reverse prevention device constructed in accordance with another embodiment in which the reverse prevention ratchet wheel is fixed to a handle shaft.

FIG. 6 shows another embodiment in which the reverse prevention ratchet wheel is mounted on the handle shaft.

In this embodiment, the handle shaft 15 supported by the reel housing 4 carries a drive gear 20 which meshes with a pinion 19 of the rotary shaft sleeve in a conventional manner. The reverse prevention ratchet wheel 3 is fixed to the portion of the handle shaft 15 behind the drive gear 20. At the same time, the reverse prevention pawl 5 is pivotally secure to the inner surface of the reel housing 4. The resilient member 11, constructed of the same material as disclosed above, includes resilient tab 10 and is fixed to the surface of the reverse prevention pawl 5. The reverse prevention pawl 5 is adapted to be switched between the operative position and the inoperative position by means of the operation lever 8 provided at a rear portion of the reel housing 4.

It will be obvious to those skilled in the art that various changes may be made without departing from the scope of the invention, and the invention is not to be considered limited to what is shown in the drawings or described in the specification.

I claim:

1. In a spinning reel for fishing having a rotor retaining a fishing line and fixed to a rotary shaft sleeve adapted to rotate via a drive mechanism actuated by rotation of a handle shaft so that fishing line is wound up on a spool by rotation of said handle shaft, a device for selectively preventing rotation of said shaft sleeve, comprising:

a toothed ratchet wheel fixed to said drive mechanism;

a pawl pivotally mounted for engagement with said ratchet wheel to selectively prevent rotation thereof;

cam means carried by said reel housing for switching said pawl between an operative position in which free rotation of said ratchet wheel is permitted in a first direction only, and an inoperative position in which free rotation of said ratchet wheel is permitted in both said first direction and a second opposite direction;

a member constructed of resilient material, said member being secured to said pawl and including a flexible tab formed unitarily with said member, said tab extending away from said member toward said ratchet wheel and engaging the teeth thereof, said tab being pivotable about its juncture with said member between a first position when said rotary shaft sleeve is rotated in said first direction, and a second oppositely directed position when said rotary shaft sleeve is rotated in said second direction, said tab being sufficiently flexible to permit free rotation of the ratchet wheel in both directions when said pawl is in its inoperative position;

movement of said tab to its first position when said pawl is in its operative position causing said pawl to be pivoted out of engagement with said ratchet wheel, and movement of said tab to its second position when said pawl is in its operative position causing said pawl to be pivoted into engagement between any two adjacent teeth of said ratchet wheel.

2. The device of claim 1 wherein said pawl is pivotally secured about an attachment shaft, and said cam means defines means for selectively urging said pawl into its inoperative position.

3. The device of claim 2, wherein said pawl includes a first portion for engaging said ratchet wheel and a second portion for engaging said cam means, said tab being located between said first and second portions in the vicinity of said attachment shaft.

4. The device of claim 1 wherein said ratchet wheel is fixed to said handle shaft.

5. The device of claim 2 wherein said ratchet wheel is fixed to said handle shaft.

6. The device of claim 3 wherein said ratchet wheel is fixed to said handle shaft.

7. The device of claim 1 wherein said resilient material is non-metallic.

8. The device of claim 1 wherein said resilient material is a plastic.

9. The device of claim 1 wherein said resilient material is an elastomer.

10. The device of claim 1 wherein said resilient material is a synthetic rubber.

11. The device of claim 1 wherein said resilient material is a flexible synthetic resin.

12. The device of claim 11 wherein resin is resistant to oil.

13. The device of claim 3, wherein said tab extends from said member at a location disposed between said attachment shaft and said pawl second portion.

14. The device of claim 2, wherein said pawl comprises a substantially planar element, and said member comprises said tab and a main body portion, said main body portion being disposed entirely along one planar side of said pawl.

15. The device of claim 14, wherein said one side of said pawl includes a pin extending therefrom, and said member is secured to said pawl at said attachment shaft and includes means, engaging said pin, for preventing movement of said member relative to said pawl.

16. The device of claim 1, wherein said pawl is pivotally mounted about an attachment shaft, and said member comprises a main body portion secured on said attachment shaft and from which said flexible tab extends, said pawl including a planar surface having pin means projecting therefrom, and said main body portion being disposed along said planar surface and including means, engaging said pin means, for preventing rotation of said body portion relative to said attachment shaft.

* * * * *